A. VIIG.
STEELYARD DAIRY SCALE.
APPLICATION FILED DEC. 15, 1911.

1,106,528.

Patented Aug. 11, 1914.

Witnesses:
L. Hoskinson
C. S. Brown.

Inventor
Anders Viig
by Foster Freeman Watson Coit
attys

UNITED STATES PATENT OFFICE.

ANDERS VIIG, OF CHRISTIANIA, NORWAY.

STEELYARD DAIRY-SCALE.

1,106,528. Specification of Letters Patent. Patented Aug. 11, 1914.

Application filed December 15, 1911. Serial No. 665,975.

*To all whom it may concern:*

Be it known that I, ANDERS VIIG, a subject of the King of Norway, residing at Christiania, Norway, have invented certain new and useful Improvements in Steelyard Dairy-Scales, of which the following is a specification.

The present invention relates to an arrangement of steelyard scales for weighing milk and similar goods in accordance with the system described in Norwegian Patent No. 10449.

The construction is shown in the annexed drawings, in which—

Figure 1:
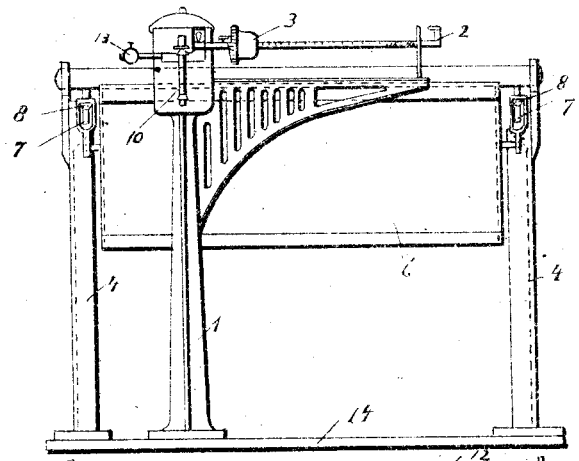
Figure 2:
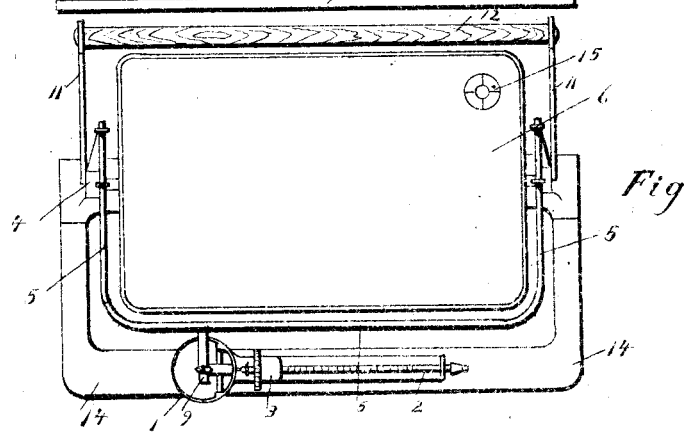
Figure 3:
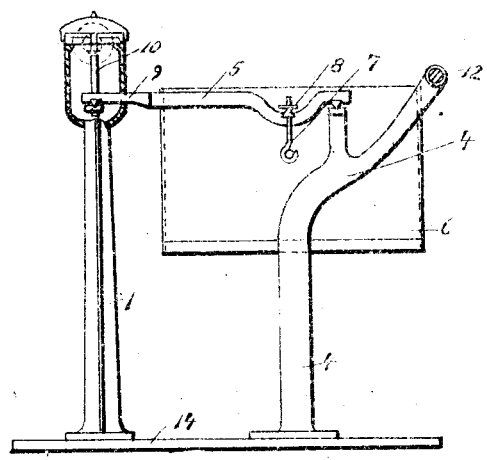

Figure 1 is a side view, Fig. 2 a top view and Fig. 3 an end view.

The scale consists of the pillar 1 with the steelyard 2 on which the movable and rotary weight 3 is arranged, the columns 4 for carrying bearings and the load sustaining fork 5 in which the receiver 6 is arranged in a suitable manner. The receiver 6 is, as will be seen from Figs. 1 and 3 suspended in links 7 and rests on the knife edges 8. The outer ends of the fork formed load sustaining part 5 rest on the columns 4 and the opposite end enters with the arm 9 into the center line of the pillar 1 and is there connected with the steelyard 2 by means of the link 10. From the columns 4 two arms 11 extend in which is placed a rod or fender 12, that may be arranged either on the side or on the end of the receiver and serves as support for the milk can, when the milk is poured into the receiver.

The present construction differs from those previously known of similar kind especially in that the fork in order to avoid special guiding bars for the receiver is arranged in such a manner, that it surrounds the receiver below the upper edge of the receiver. When the receiver has been filled the weight of its contents will press on the knife edges 8 and on the connecting link 10 which latter again acts on the steelyard 2 and carries this upward, whereby the weight of the contents of the receiver may be determined by adjustment of the weight 3. The receiver and the steelyard is regulated back to zero by using the regulating weight 13.

The pillar 1 and the columns 4 are fixed to the base plate 14. The receiver 6 is emptied through a valve 15 in the bottom in connection with suitable piping.

Claims:

1. A weighing mechanism comprising two uprights 4, a forked support having its arms fulcrumed adjacent their ends on said uprights, a column 1, a scale beam fulcrumed on the column, a link connection between the forked support and scale beam, and a receptacle suspended from the arms of the forked support at points between the fulcrum of the latter and the connection of the beam therewith.

2. A weighing mechanism comprising two uprights 4, a forked support having its arms fulcrumed on top of said uprights, a column 1 outside of the forked support, a scale beam fulcrumed on the column, above the horizontal plane of the forked support, a link connection between the beam and forked support, a receptacle suspended from and having its upper edge above the arms of said support, arms 11 extending from the uprights beyond and above the section of the receptacle that is entirely outside of the forked support, and a bar 12 supported by said arms, for the purpose described.

In testimony whereof I affix my signature in presence of two witnesses.

ANDERS VIIG.

Witnesses:
RAY M. NIKEN,
MAGDA XRNESEN.